US011305313B2

(12) United States Patent
Rohrbach et al.

(10) Patent No.: US 11,305,313 B2
(45) Date of Patent: Apr. 19, 2022

(54) APPARATUS FOR TRANSMITTING ULTRASOUND

(71) Applicant: MS Ultraschall Technologie GmbH, Spaichingen (DE)

(72) Inventors: Lea Rohrbach, Spaichingen (DE); Joachim Engenhart, Spaichingen (DE)

(73) Assignee: MS Ultraschall Technologie GmbH

(*) Notice: Subject to any disclaimer, the term of this patent is extended or adjusted under 35 U.S.C. 154(b) by 0 days.

(21) Appl. No.: 17/005,265

(22) Filed: Aug. 27, 2020

(65) Prior Publication Data

US 2021/0060616 A1 Mar. 4, 2021

(30) Foreign Application Priority Data

Aug. 28, 2019 (DE) ......................... 102019123071.3

(51) Int. Cl.

| | |
|---|---|
| ***B32B 37/00*** | (2006.01) |
| ***B06B 3/00*** | (2006.01) |
| ***G10K 11/32*** | (2006.01) |

(52) U.S. Cl.

CPC ................ *B06B 3/00* (2013.01); *G10K 11/32* (2013.01)

(58) Field of Classification Search

USPC ........................................................ 156/580.1

See application file for complete search history.

(56) References Cited

U.S. PATENT DOCUMENTS

| | | | | |
|---|---|---|---|---|
| 3,546,498 | A | 12/1970 | McMaster | |
| 2010/0179654 | A1 * | 7/2010 | Mayer ....................... | A61F 2/46 623/17.11 |

FOREIGN PATENT DOCUMENTS

| | | | |
|---|---|---|---|
| DE | 69202452 | T2 | 1/1996 |
| DE | 10337272 | A1 | 3/2005 |
| DE | 102016116429 | A1 | 3/2018 |
| EP | 1229515 | A2 | 8/2002 |
| EP | 1991154 | A2 | 11/2008 |
| WO | 2007101362 | A2 | 9/2007 |

OTHER PUBLICATIONS

German Search Report for related German Application No. 102019123071.3; dated Apr. 24, 2020; 6 pages.

* cited by examiner

*Primary Examiner* — James D Sells

(74) *Attorney, Agent, or Firm* — Dickinson Wright PLLC

(57) ABSTRACT

An apparatus for transmitting ultrasound comprises a curved oscillating body having a coupling surface for coupling a converter, wherein the oscillating body is curved and has a recess.

16 Claims, 2 Drawing Sheets

APPARATUS FOR TRANSMITTING ULTRASOUND

CROSS-REFERENCES TO RELATED APPLICATIONS

Figure 1:
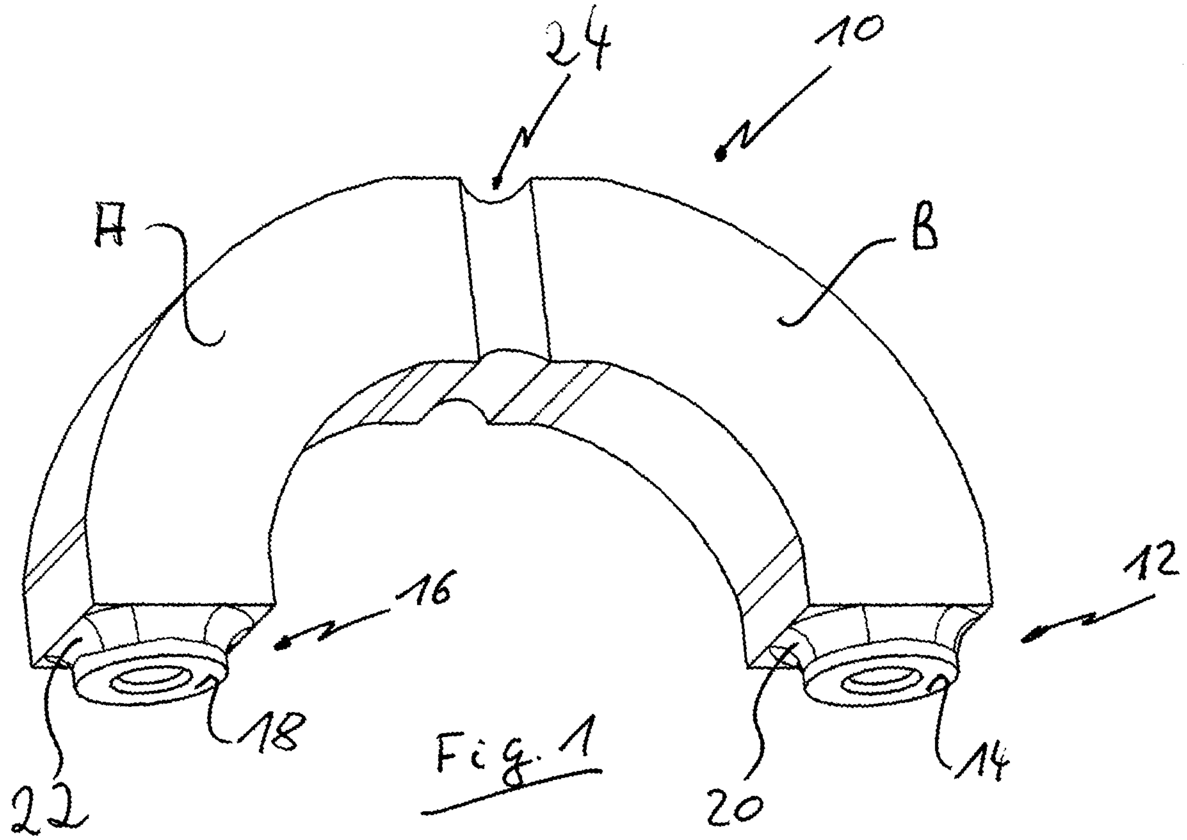

This Patent Application claims the priority of German Patent Application 102019123071.3, filed on Aug. 29, 2019, which is incorporated herein by reference, in its entirety.

The present invention relates to an apparatus for transmitting ultrasound. Such apparatus are generally known from the prior art and serve, among other things, for amplitude transformation or amplitude amplification of the ultrasonic oscillations transmitted from a converter to a sonotrode.

It is the object of the present invention to provide an apparatus for transmitting ultrasound that enables a compact design in tight or complex space conditions.

This object is satisfied by the features of claim 1 and in particular in that the apparatus has a curved oscillating body having a coupling surface provided at one end for coupling a converter, wherein the oscillating body is in particular curved in the shape of a U, of an S, or of a J. Furthermore, the oscillating body has at least one recess between the coupling surface and the end opposite thereto, said recess extending over the periphery of the oscillating body. With an oscillating body of such a design, very good results can be achieved despite the curved design due to the recess extending over the periphery of the oscillating body, wherein an assembly of the total arrangement can also take place without problem in very complex or tight space conditions due to the curved design of the oscillating body.

Advantageous embodiments of the invention are described in the description, in the drawing and in the dependent claims.

In accordance with a first advantageous embodiment, the oscillating body can have a substantially constant cross-sectional shape apart from the recess. This means that the oscillating body is formed uniformly over its essential extent and has the same cross-sectional shape apart from the recess or from a base for coupling surfaces.

In accordance with a further advantageous embodiment, the oscillating body can have part sections of quadrant shape at both sides of the recess so that a deflection by 90° in the same plane or in different planes is achieved by each part section. Such a design of part sections of quadrant shape, between which a recess is located, has achieved good results in tests.

In accordance with a further advantageous embodiment, the recess can be curved in cross-section, for example, as a peripheral annular groove.

In accordance with a further advantageous embodiment, a further coupling surface for a sonotrode can be provided at the end disposed opposite the coupling surface. In this way, the oscillating body can be equipped with different sonotrodes and converters due to a modular design.

In accordance with a further advantageous embodiment, a sonotrode can be molded in one piece to the end disposed opposite the coupling surface. With a component of such a very compact design, complicated installation situations can be managed and losses can be minimized due to an interruption-free material transition between the sonotrode and the oscillating body.

Furthermore, it can be advantageous if a recess is likewise provided between the sonotrode and the oscillating body in the above-described embodiment since the oscillation behavior of the total apparatus can hereby be improved.

In accordance with a further advantageous embodiment, the oscillating body can have a rectangular cross-section or a square cross-section. In contrast to other cross-sections or even to asymmetrical cross-sections, a particularly uniform oscillation behavior can hereby be achieved.

A similar advantage can be achieved if the oscillating body has a constant radius of curvature at both sides of the recess.

Furthermore, good results were able to be achieved with an oscillating body whose curvature has at least one inflection point and in particular exactly one inflection point.

It may be advantageous for complex shapes of the oscillating body if the oscillating body is formed in multiple parts.

The oscillating body can generally be curved in any desired planes, which can be of advantage in complex installation situations. However, it may also be advantageous to form the oscillating body as curved within only one plane. A further advantageous embodiment can be formed in that the oscillating body is curved in two planes extending at right angles to one another.

The present invention will be described in the following purely by way of example with reference to advantageous embodiments and to the enclosed drawings.

Figure 2:
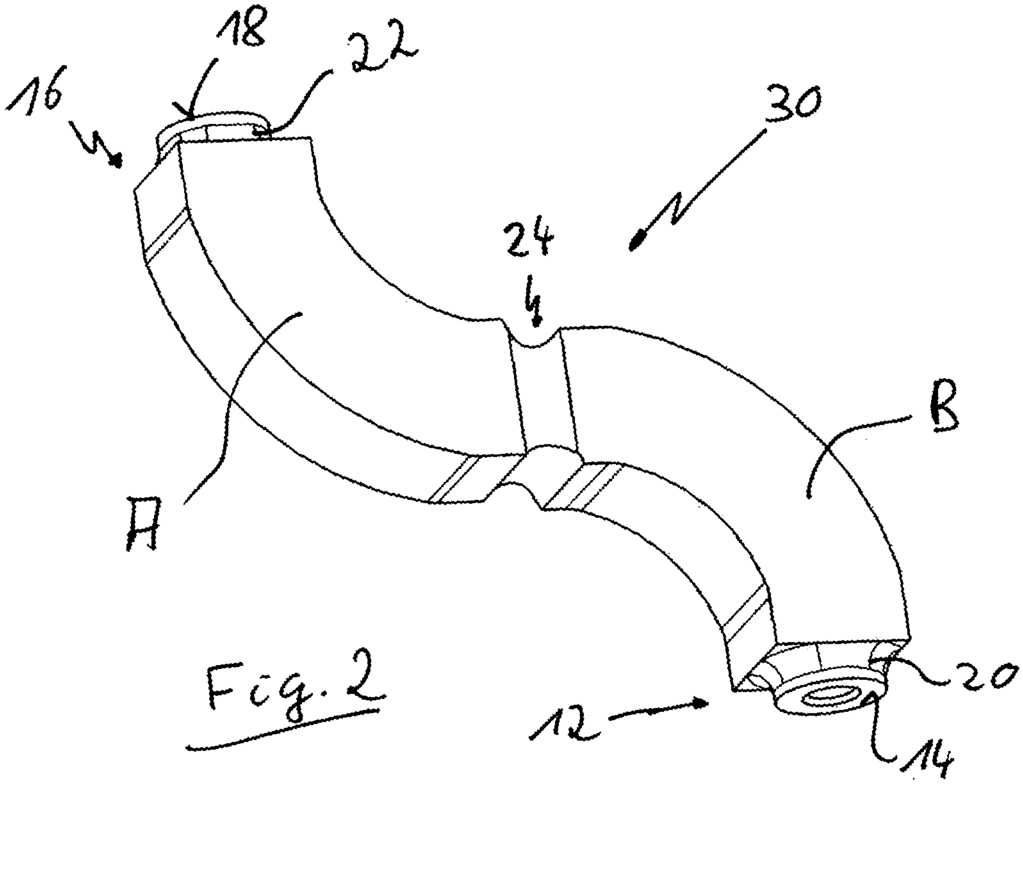
Figure 3:
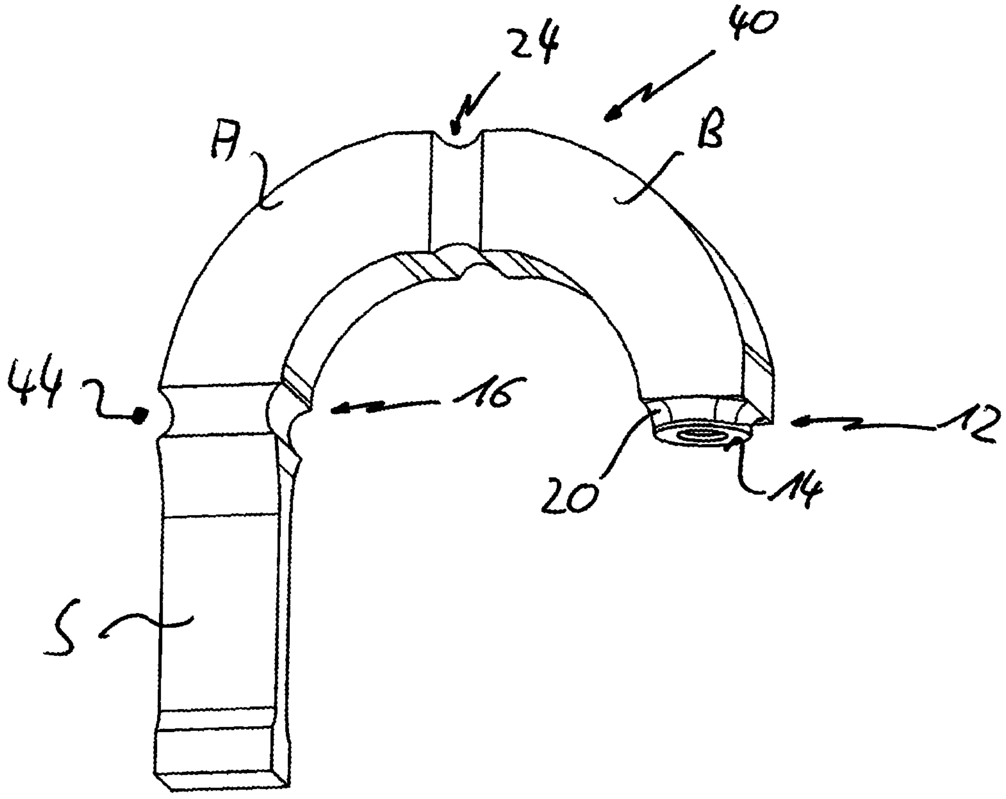

There are Shown:

FIG. 1 an oscillating body in the shape of a U;

FIG. 2 an oscillating body in the shape of an S;

FIG. 3 an oscillating body in the shape of a J; and

Figure 4:
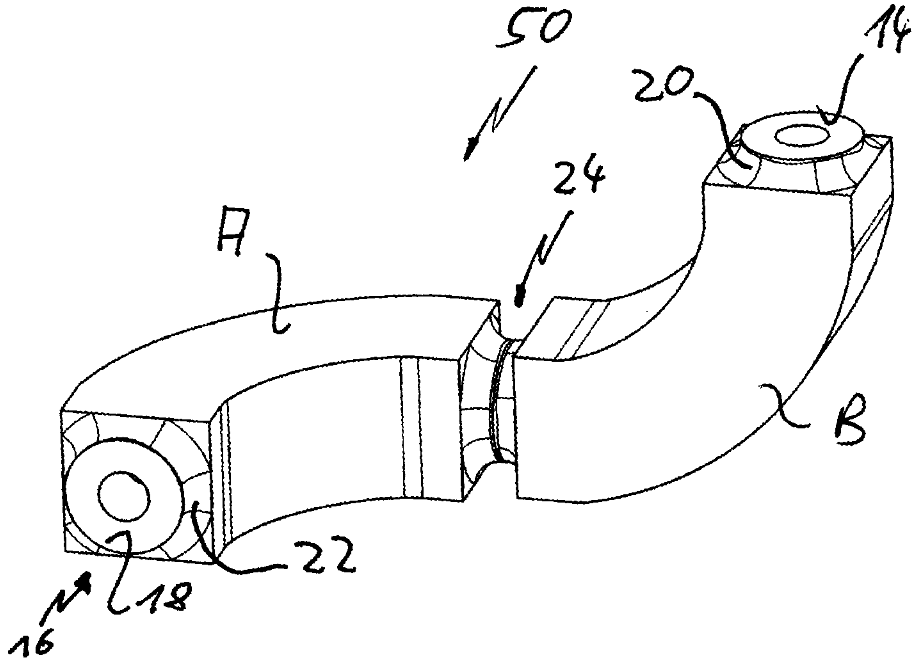

FIG. 4 an oscillating body curved in two planes extending at right angles to one another.

FIG. 1 shows a first apparatus for transmitting ultrasound to a sonotrode that shows a curved oscillating body 10 having a coupling surface 14 formed at one end 12 for coupling a converter. The oscillating body 10 is formed in the shape of an (inverted) U and has a further coupling surface 18 for a sonotrode at the end 16 disposed opposite the coupling surface 14. Both coupling surfaces 14 and 18 are formed in circular ring shape and are molded to the oscillating body 10 via a base 20 or 22.

A recess 24 extending over the periphery of the oscillating body is provided at the center between the two ends 12 and 16, i.e. between the coupling surface 14 and the coupling surface 18, and divides the oscillating body into two sections A and B of quadrant shape.

As FIG. 1 illustrates, the oscillating body 10 has a constant, approximately rectangular cross-sectional shape apart from the recess 24 and from the bases 20 and 22 with the coupling surfaces 14 and 18 molded thereat. In the embodiment shown, the recess 24 is concavely curved in cross-section so that a total of four grooves extending at right angles to one another are formed at the outer periphery of the oscillating body 10 by the recess 24. The oscillating body 10 of FIG. 1, which is manufactured in one piece from metal, has a constant radius of curvature at both sides of the recess 24 so that the shape of a U results overall.

FIG. 2 shows a further embodiment of an oscillating body 30, with the same reference numerals being used for the same components. The oscillating body 30 of FIG. 2 only differs from the oscillating body 10 of FIG. 1 in that the two curved sections A and B at both sides of the recess 24 are oriented such that the shape of an S (or approximately of a Z) results for the oscillating body. Here, the oscillating body also has a constant radius of curvature at both sides of the recess 24. However, the curvature of the oscillating body has an inflection point at its center, i.e. in the region of the recess 24.

The oscillating body 40 shown in FIG. 3 corresponds in its basic design to the oscillating body 10 of FIG. 1. However, the oscillating body 40 does not have a base or a further coupling surface at its end 16 disposed opposite the coupling surface 14. Instead, a sonotrode S is molded in one piece to the end 16, wherein a further recess 44 which is designed in the same manner as the recess 24 is provided between the sonotrode S and the section A of the oscillating body 40.

FIG. 4 shows a further embodiment of an oscillating body 50 that corresponds in its basic design to the oscillating body 30 of FIG. 2, with, however, the two sections A and B, which are each of quadrant shape, being rotated by 90° with respect to the embodiment of FIG. 2. The oscillating body 50 is hereby curved in two planes standing at right angles to one another, i.e. the two coupling surfaces 14 and 18 do not extend in one and the same plane (FIG. 1) and also not within two parallel planes (FIG. 2). Instead, in the oscillating body 50, the two coupling surfaces 14 and 18 extend in two planes standing at right angles to one another. The recess 24 is likewise curved in cross-section in the embodiment of FIG. 4.

The invention claimed is:

1. An apparatus for transmitting ultrasound, the apparatus comprising a curved oscillating body having a coupling surface provided at one end for coupling a converter, and wherein the oscillating body has at least one recess between the coupling surface and the end opposite thereto, said recess extending annularly over the entire periphery of the oscillating body.

2. The apparatus in accordance with claim 1, wherein the oscillating body is curved in the shape of one of a U, an S, and a J.

3. The apparatus in accordance with claim 1, wherein the oscillating body has a substantially constant cross-sectional shape apart from the recess.

4. The apparatus in accordance with claim 1, wherein the oscillating body has part sections of quadrant shape at both sides of the recess.

5. The apparatus in accordance with claim 1, wherein the recess is curved in cross-section.

6. The apparatus in accordance with claim 1, wherein a further coupling surface for a sonotrode is provided at the end disposed opposite the coupling surface.

7. The apparatus in accordance with claim 1, wherein a sonotrode is molded in one piece to the end disposed opposite the coupling surface.

8. The apparatus in accordance with claim 7, wherein a recess is provided between the sonotrode and the oscillating body.

9. The apparatus in accordance with claim 1, wherein the oscillating body has one of a rectangular cross-section and a square cross-section.

10. The apparatus in accordance with claim 1, wherein the oscillating body has a constant radius of curvature at both sides of the recess.

11. The apparatus in accordance with claim 1, wherein the curvature of the oscillating body has at least one inflection point.

12. The apparatus in accordance with claim 11, wherein the curvature of the oscillating body has exactly one inflection point.

13. The apparatus in accordance with claim 1, wherein the oscillating body is formed in multiple parts.

14. The apparatus in accordance with claim 1, wherein the oscillating body is only curved in one plane.

15. The apparatus in accordance with claim 1, wherein the oscillating body is curved in two planes extending at right angles to one another.

16. The apparatus in accordance with claim 9, wherein the recess forms four grooves at right angles to one another, with a separate one of the grooves being formed along each side of the one of a rectangular cross-section and a square cross-section of the oscillating body.

* * * * *